May 20, 1924.

C. H. HAPGOOD 1,494,601

SELF LOCKING MECHANISM FOR WEIGHING SCALES

Filed Dec. 26, 1919   2 Sheets-Sheet 1

Witnesses
C. E. Wilcox

Inventor
Clarence H. Hapgood.
By George R. Frye.
Attorney

May 20, 1924. 1,494,601
C. H. HAPGOOD
SELF LOCKING MECHANISM FOR WEIGHING SCALES
Filed Dec. 26, 1919 2 Sheets-Sheet 2
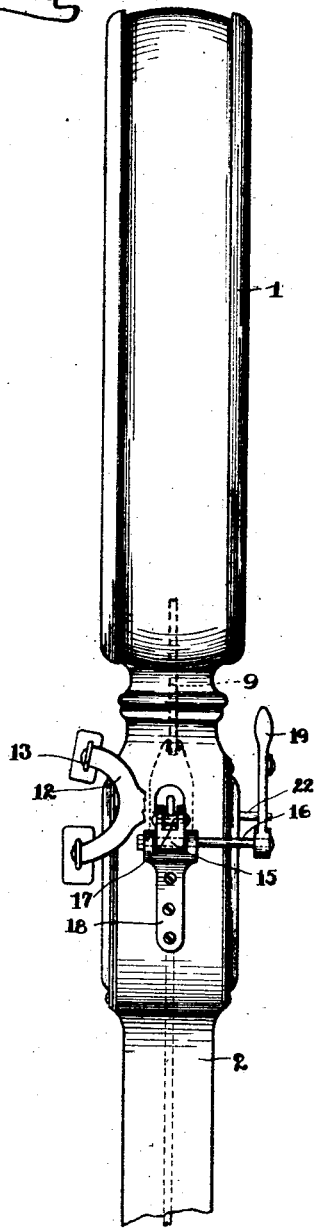
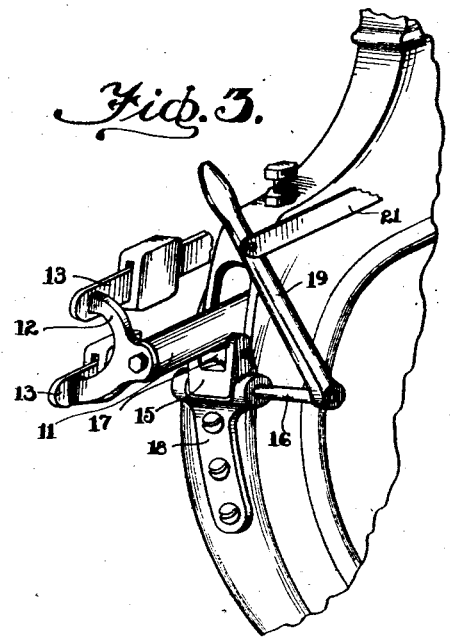
Witnesses
C. E. Hilcox.
Inventor
Clarence H. Hapgood.
By George R. Frye
Attorney Patented May 20, 1924.

1,494,601

UNITED STATES PATENT OFFICE.

CLARENCE H. HAPGOOD, OF TOLEDO, OHIO, ASSIGNOR TO TOLEDO SCALE COMPANY, OF TOLEDO, OHIO, A CORPORATION OF NEW JERSEY.

SELF-LOCKING MECHANISM FOR WEIGHING SCALES.

Application filed December 26, 1919. Serial No. 347,398.

*To all whom it may concern:*

Be it known that I, CLARENCE H. HAPGOOD, a citizen of the United States, residing at Toledo, in the county of Lucas and State of Ohio, have invented certain new and useful Improvements in Self-Locking Mechanism for Weighing Scales, of which the following is a specification.

This invention relates to weighing scales and more particularly to means for locking the weighing mechanism thereof in inoperative position, and its principal object is to provide a manually-releasable device which will hold the scale in locked condition and which will automatically re-lock the scale when released.

Other objects and advantages will be apparent from the following description, in which reference is had to the accompanying drawings illustrating a preferred embodiment of my invention and in which similar reference numerals designate similar parts throughout the several views.

In the drawings:—

Figure 2 is a side elevation of a portion of the scale shown in Figure 1; and

Figure 3 is a perspective view of a portion of the scale, showing the co-operation of the locking device therewith.

Figure 1:
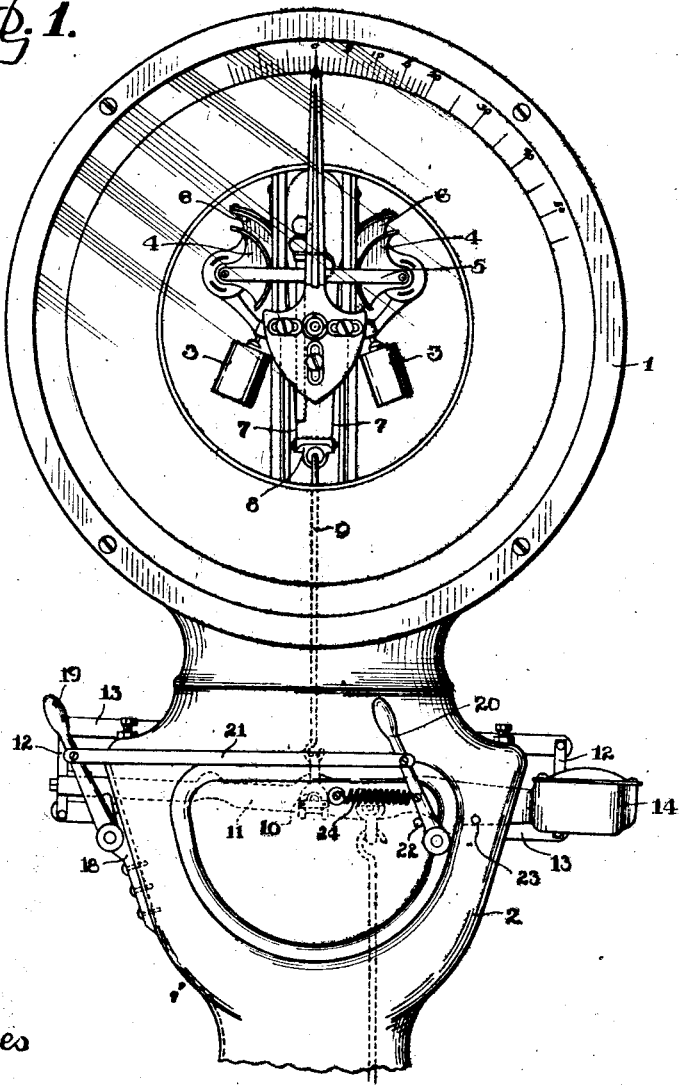
Figure 1 is a rear elevation of a portion of a scale embodying my invention.

In the drawings, 1 designates the casing of a scale adapted to enclose the weighing or load-offsetting mechanism and supported upon a column 2, only the upper part of which is shown in the drawings. The column 2 is adapted to be supported upon the base housing (not shown). It will be understood that any suitable platform or platform lever mechanism may be employed in connection with the weighing mechanism of the scale, and the weighing mechanism herein shown is illustrated merely for the purpose of showing one application wherein the present invention can be readily employed. The particular scale herein shown has been found to successfully demonstrate the capabilities of the invention, and employs a pendulum weighing mechanism including a pair of oppositely-disposed pendulums 3, each of which comprises supporting segments 4 secured on transverse shafts and the two shafts are connected together by crossbars 5, the segments 4 being suitably suspended from the lower ends of flexible supporting ribbons secured at their upper ends to the framework of the scale. Intermediate the supporting segments of each pendulum is a somewhat larger segment 6 which is also fixed to the transverse shaft, said segment extending at its periphery between the pillars of the framework supporting the segments 4 and being connected at its upper end to a flexible metallic ribbon 7 which extends over the arcuate face of the segment and is attached at its lower end to an equalizer 8. The construction of the two pendulums is substantially identical and the ribbons 7, as shown in Figure 1, are connected to opposite sides of the equalizer 8 which is pivotally connected at its center to the upper end of the hook rod 9, the lower end of said hook rod being connected to a stirrup 10 having bearings receiving the knife-edge pivots of the tare beam lever 11 which is fulcrumed in the column 2 and extends transversely thereof.

The ends of the lever 11 project from opposite sides of the column and carry brackets 12 to which are secured tare beams 13, the tare beams 13 extending across the front of the column 2 and carrying slidable poises to offset tare in the well-known manner. The lever is also provided with a counterweight 14 in the form of a loading box to neutralize the weight of the lever 11 and the parts carried thereby.

In order to prevent injury to the load-offsetting mechanism from shocks or jars due to objects being thrown on the scale platform or to the platform being used as part of a runway for trucks, etc., I have provided a device for lifting the knife-edge pivots of the lever 11 from the bearings in the stirrup 10 and locking the lever in elevated position so that shocks and jars cannot be transmitted from the platform to the load-offsetting mechanism.

The locking device consists of the bracket 15 rigidly mounted upon the rock shaft 16 and carrying a roller 17 adapted to engage the lever 11 and raise it from the bearings in the stirrup 10 or to release the lever and allow it to rest in the bearings according to the direction in which the shaft is rocked. The rock shaft 16 is journaled in a bracket 18 secured at one side of the housing 2, and is provided with a handle 19 so that it may be conveniently manipulated by one standing adjacent that side of the scale. In order that the device may be manipulated from the other side of the scale I have mounted a second handle 20 so that it may be conveniently reached therefrom, the handles being connected by a link 21 which causes them to move together.

Lugs 22 and 23 project into the path of the handle 20 and serve to limit the movement of the device. The lug 23 is so located that the device may move to an extent sufficient to allow the roller 17 to remain out of contact with the lever 11 when it is pulled downwardly by a load on the scale platform to any extent within the capacity of the scale. The lug 22 is so located as to allow the handle 20 and connected parts to swing beyond the position in which the maximum lift is given to the lever 11 so that when the handle 20 is in engagement with the lug 22 the device is held in locking position by gravity and does not tend to become unlocked when a load is placed on the platform. On the contrary, the greater the load, the more securely the lever is locked in raised position.

The device as so far described forms an efficient lock for the scale when manually operated. It sometimes happens, however, that scales which are provided with locks are, through carelessness or thoughtlessness, left unlocked. I have in this case provided against such inadventence by making the locking device semi-automatic in its action, the means employed to effect automatic operation thereof being a retractile spring 24, one end of which is attached to the handle 20, the other end being attached to the column 2. When it is desired to operate the scale, the operator swings either handle 19 or 20, thereby lowering the pivots of the lever 11 into the bearings and stirrup 10. The scale is then free from the influence of the locking device. When the weighing operation is completed, the operator releases the handle and the spring 24 moves the locking mechanism to automatically re-lock the scale.

While it will be apparent that the illustrated embodiment of my invention herein disclosed is well calculated to adequately fulfill the objects primarily stated, it is to be understood that the invention is susceptible to variation, modification and change within the spirit and scope of the subjoined claims.

Having described my invention, I claim:

1. In a scale, in combination, a pair of pivoted handles mounted to be accessible from different sides of the scale, a locking device connected to one of said handles, and means so connecting said handles that said locking device may be operated by moving either handle.

2. In a scale, in combination, a lever, a lever locking device, a handle connected thereto, a second handle positioned so as to be conveniently accessible from another side of the scale connected to the first said handle to move therewith, and a spring yieldingly holding said handles in a position to lock said lever.

3. In a scale, in combination, a lever, a pivoted lever locking device, a handle secured thereto, a second handle positioned so as to be conveniently accessible from another side of the scale connected to the first said handle to move therewith, and a spring connected to the second said handle and yieldingly holding it in position to lock said lever.

4. In a scale, in combination, automatic load-offsetting mechanism, a lever, pivots on said lever, bearings connected to said load-offsetting mechanism and carrying said pivots, means to automatically elevate said lever and thereby lift said pivots from said bearings.

5. In a scale, in combination, a lever, and a lever locking device including a rock shaft, a bracket secured thereto, a roller carried by said bracket and adapted to engage said lever, a handle secured to said rock shaft, a second handle mounted at a distance from the first said handle, and a link connecting said handles to cause them to move together.

6. In a scale, in combination, a lever, and a lever locking device including a rock shaft, a bracket secured thereto, a roller carried by said bracket and adapted to engage said lever, a handle secured to said rock shaft, a second handle mounted at a distance from the first said handle, a link connecting said handles to cause them to move together, and a spring connected to said second handle and tending to move it in a direction to cause said roller to engage said lever.

CLARENCE H. HAPGOOD.

Witnesses:
  C. O. MARSHALL,
  FRANCES DOYLE.